Sept. 19, 1933.  S. H. PELTIER  1,927,650
METHOD OF AND DEVICE FOR MAKING VITREOUS OBJECTS
Filed July 21, 1928  2 Sheets-Sheet 1
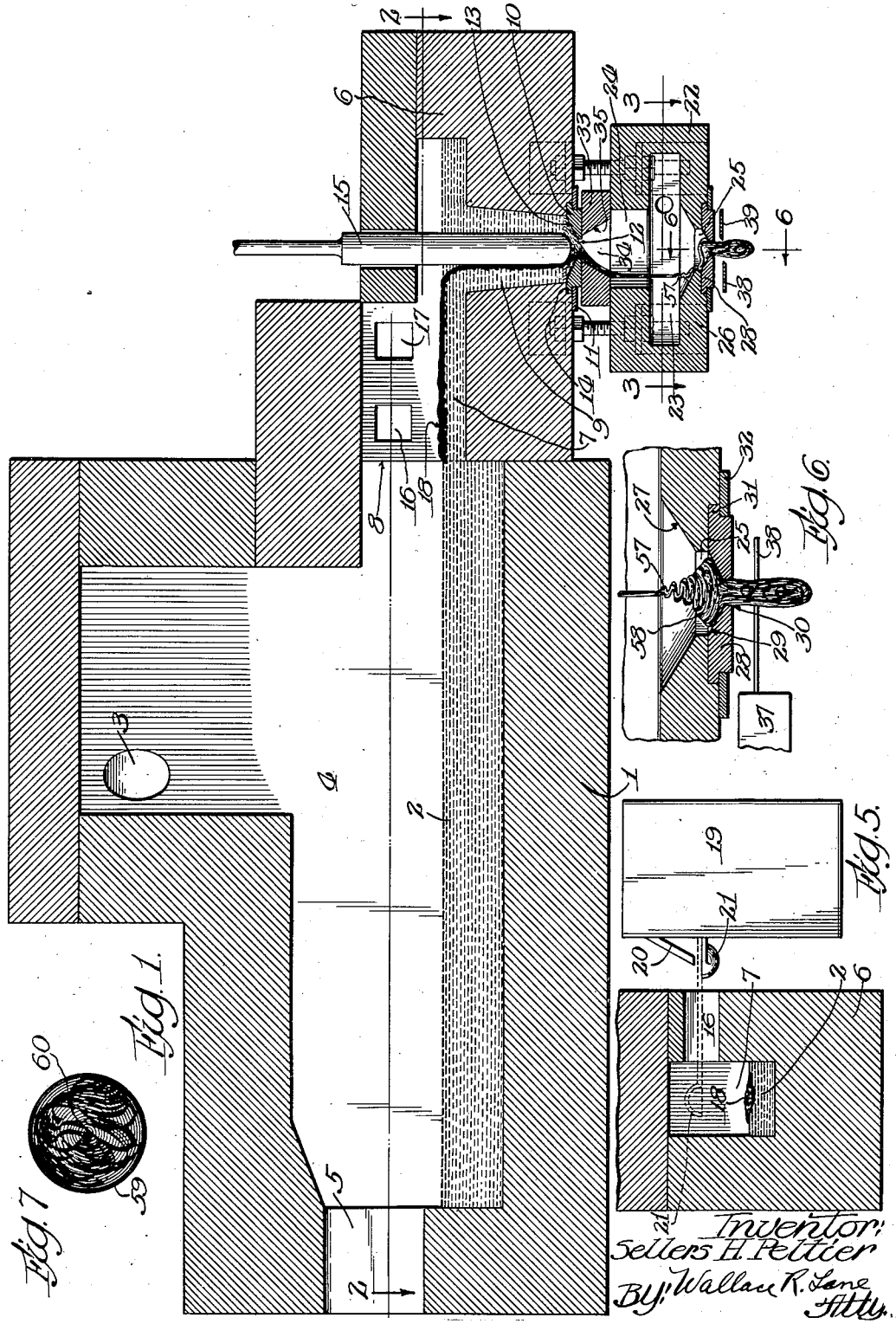

Sept. 19, 1933.  S. H. PELTIER  1,927,650
METHOD OF AND DEVICE FOR MAKING VITREOUS OBJECTS
Filed July 21, 1928  2 Sheets-Sheet 2
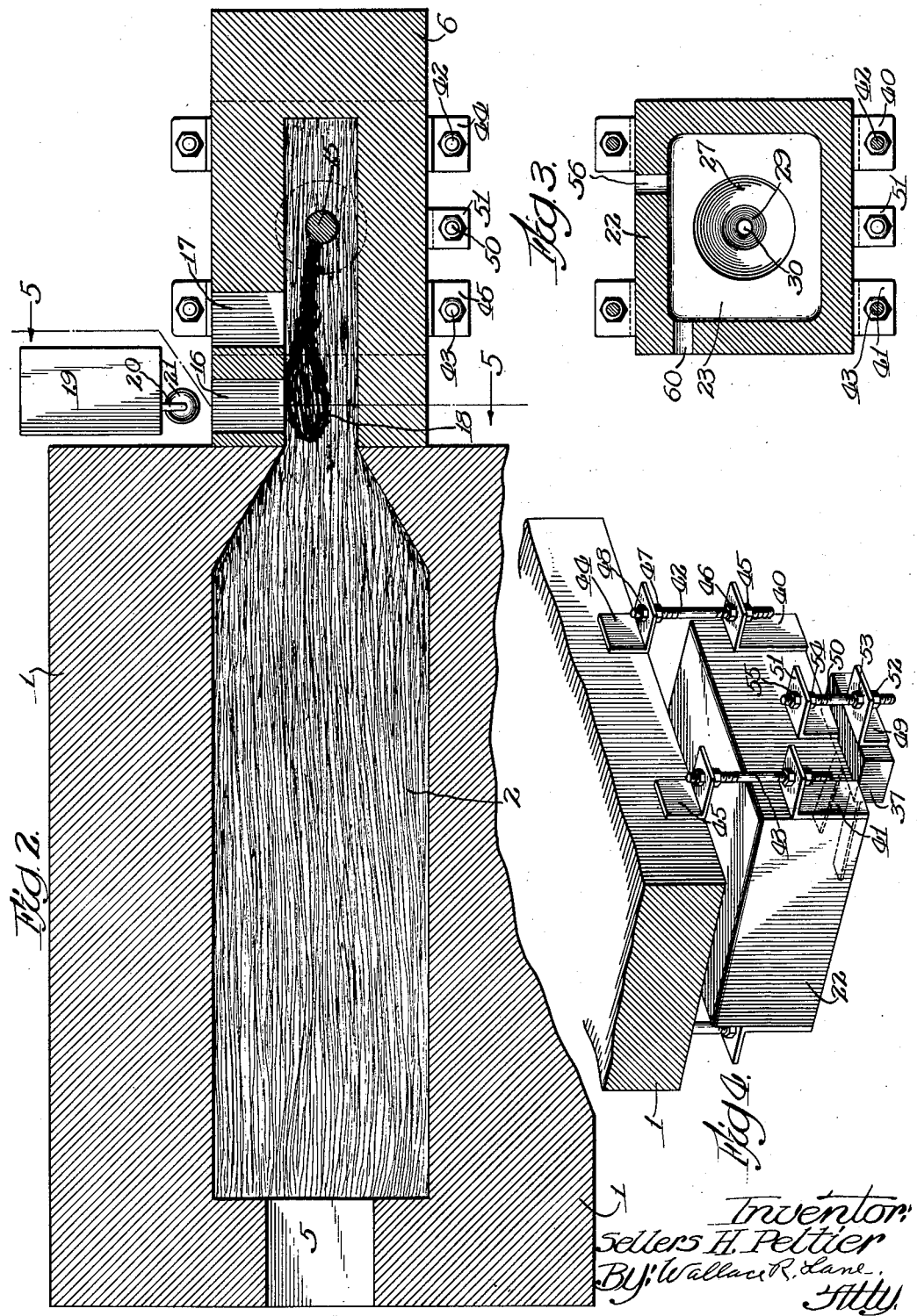

Patented Sept. 19, 1933

1,927,650

UNITED STATES PATENT OFFICE 1,927,650

METHOD OF AND DEVICE FOR MAKING VITREOUS OBJECTS

Sellers H. Peltier, Ottawa, Ill., assignor to The Peltier Glass Company, Ottawa, Ill., a corporation of Illinois Application July 21, 1928. Serial No. 294,552

31 Claims. (Cl. 49—55)

The present invention relates to methods of and devices for making vitreous objects, such as glass marbles and various other like and similar articles.

Among the objects of the invention is to provide a novel method of and novel means for producing variegated or striated vitreous objects, such as glass marbles with included striae, with the striae or streaks or the like distinctly appearing in the mass or body of the object and thoroughly well distributed therein, and to produce such repeatedly and continuously for object after object, in a device capable of operating practically automatically.

In devices and methods where the gob, or suspended or mold charge is severed or cut-off at the flow or delivery port or opening of a melting tank, the striating material usually does not extend in the form of a line or narrow streak throughout the mass of the translucent vitreous or glass body, but is usually in the form of a more or less irregular spot or blotch at one side of the body of the finished object. If the outflowing molten mass can be drawn out or attenuated sufficiently, and then re-fused, before the suspended or mold charge is cut off, then the striating material may become distributed in the mass of the suspended or mold charge, so as to appear as a group of lines or streaks therein.

My invention comprehends the extending of the outflowing material into the form of an elongated or attenuated stream of columnar or like form, and causing such stream to flow, as between vertically alined and spaced delivery means, such as orifices, with a given or predetermined drop which may be varied at will, and fused with an intermixture and interlacing of striae in the molten mass prior to severing mold charges therefrom. In a practical device selected to illustrate this invention, I have found that the stream length or drop to be very efficient when it is about nine inches, although good and satisfactory results can be obtained with streams or drops of greater or less lengths.

Another object of the invention is to act upon the stream in such a manner that the stria in the stream will be made to take a more or less tortuous or folded or doubled form and be distributed throughout the entire mass of the completed or finished object, yet with the parts or segments of the included stria spaced from each other. This, I have found, to be well effected by causing the flowing or dropping stream to take a tortuous path, or to vibrate or waver laterally, or both, and to cause a piling of the vibrated or wavered stream so that the clear or transparent component of the mass may cohesively pile or weld together or unite, and hold the stria in a more or less tortuous, intermixed or interlaced form or condition, which might be expressed as being held in suspension in the clear mass. The piled mass with the suspended and included tortuous, bent, doubled or folded stria passes to and through or over the second delivery means or orifice, and then is severed or cut off in gobs or suspended or mold charges. Thence, the charges are conducted to shaping, forming or moulding devices. In the case of marbles, the charges are fed to grooved rollers and are, while in plastic condition, rolled into the form of spheres and then discharged therefrom with or without the annealing step.

A further object of the invention is to provide a novel means in the form of an auxiliary furnace for supplying heat to the stream as it is drawn out, vibrated and piled, such furnace having contact surfaces therein, such as inclined surface portions at the upper and lower parts thereof for the deviating of the path of flow of the stream, and for providing a piling surface for the piling action above mentioned.

A further object is to provide means for varying the length of the stream as also the length of the suspended charge passing out of the auxiliary furnace. This may be effected by mounting the auxiliary furnace in or on an adjustable support whereby this furnace may be raised or lowered with reference to the outlet of the melting tank. Also, by varying the extent of the inclined surface portions to which the flowing molten stream adheres and upon which the stream piles, the effective length of the stream may be varied or adjusted as desired. Also, the means, which may be any suitable automatic cutter or shear, for severing the suspended charges, may be mounted beneath the auxiliary furnace on a support which is also adjustable to raise and lower the shears with reference to the outlet of the auxiliary furnace, whereby the size of the gobs or suspended charges, and the ultimate size of the finished article is determined.

As another object of the invention, is the provision of a simple means for and a simple way of supplying the striating material to the main or body part of the object. The melting pot or tank may have an extension or forehearth leading to a discharge means, such as a well, and having one or more openings through which given quantities of the striating material may be periodically added to or charged upon the surface of the molten material flowing toward the discharge means. This is at a point sufficiently remote from the discharge means so that as the striating material floats upon the main molten mass, it will melt and join with or be included in the main stream moving to and into or over the discharge means.

Other objects, advantages, capabilities, features and process steps are comprehended by the invention as will later appear and are inherently possessed thereby.

Referring to the drawings:

Fig. 1 is a vertical sectional view taken through a device following the invention.

Fig. 2 is a horizontal sectional view of the same taken in a plane represented by line 2—2 in Fig. 1 of the drawings.

Fig. 3 is a horizontal sectional view taken through the auxiliary furnace and in a plane represented by line 3—3 shown in Fig. 1 of the drawings.

Fig. 4 is a fragmentary perspective view of part of the device showing the means for adjusting the auxiliary furnace with reference to the melting tank and the cutter with reference to the auxiliary furnace.

Fig. 5 is a transverse sectional view taken in planes represented by line 5—5 in Fig. 2 of the drawings.

Fig. 6 is a fragmentary transverse sectional view taken in a plane represented by line 6—6 in Fig. 1 of the drawings; and Fig. 7 is a view of a completed or finished article or object made in accordance with this invention.

Referring now more in detail to the drawings, the embodiment selected to illustrate the invention and the process of the invention, is shown in connection with a melting tank or pot 1 in which is contained the molten mass 2 of the material, such as glass, to form the body or main component or part of the finished object. This tank is in the form of a furnace having one or more burner openings 3 for the introduction of burning fuel or incandescent material to effect the desired heat within the chamber 4 of the furnace and above the mass 2, to melt or fuse the latter and to maintain the latter in molten and fused condition. At one end, the furnace may be provided with an opening 5 through which the glass batch or cullet may be introduced or charged from time to time to maintain the quantity of the molten material 2 in the tank.

At one end of the tank or furnace 1 is provided an extension or forehearth 6 having therein a shallow trough or channel 7 communicating through an opening 8 at one end of the tank and leading to a discharge means, such as a well or throat 9 in the lower part of which is located a discharge orifice or flow port bushing 10 of suitable refractory material and held in position as clearly shown in Fig. 1 of the drawings, by supporting plates 11 forming a part of the cage or frame of the furnace extension 6. The bushing 10 has a central opening 12 serving as the outlet orifice or flowhole for the material from the well 9, and has an inclined or conical surface portion 13 over which the material can flow toward the hole or orifice 12. The bushing also has a flange or shouldered part 14 for resting upon the supporting plates 11. Within the well 9 may extend a refractory valve plunger or plug 15 which extends upwardly through the cap of the extension 6 and may be raised or lowered and also rotated if and as desired or necessary. This plunger may be used to control the rate of flow of the mass through the throat 9.

The rate of flow through this delivery port will depend in part on the depth of the material in the well 9, and in part on the size of the discharge orifice 12. The plunger 15 may be omitted if desired.

At one side of the extension 6, may be provided one or more openings 16 and 17 through which striating material may be introduced into the extension and charged or dumped upon the surface of the molten material flowing through the channel 7. This striating material is clearly shown in the drawings, as identified by the reference character 18. Any suitable means may be used for charging this material into the extension, and in Fig. 5 is shown conventionally an automatic machine 19 having a spout 20 through which the material may be intermittently fed into a ladle 21 connected to suitable mechanism within the machine and adapted to be periodically reciprocated through either opening 16 or 17 and rotated so as to invert it, as shown by dotted lines of the ladle in Fig. 5. In this position the contents of the ladle are dropped or dumped upon the molten material in the channel 7.

Beneath the extension or forehearth 6 is located an auxiliary furnace 22 having a chamber 23, an upper opening 24 located below the discharge opening of the well 9, and a lower opening or outlet 25, the lower wall 26 of the auxiliary furnace having an inclined surface portion 27 as clearly shown in Figs. 1 and 6 of the drawings. These openings 24 and 25 are preferably in vertical alinement with each other and with the delivery opening 12 of the well or throat 9, but this alinement is not essential. Adjacent the opening 25 is supported a delivery or flow port or orifice bushing 28 having an inclined surface portion 29 leading to a central opening or hole 30, this serving as the flow or delivery hole, port or orifice. The bushing 28 has a flange or shouldered portion 31 resting upon suitable metal pieces 32 forming a part of the cage or frame of the furnace 22.

At the upper part of the furnace is supported and interposed a bushing 33 with the upper surface thereof contacting with the lower surface of the bushing 10, and having the central opening 34 diverging downwardly to form an inclined heated surface portion 35, as clearly shown in Fig. 1 of the drawings. This block 33 serves for the purpose of preventing escape of heat or the heating medium from the upper part of the auxiliary furnace, and the inclined surface 35 serves for the adhering of the outflowing material from the orifice 12 as will be later explained. The upper end of the hole 34 is preferably slightly larger than the orifice 12 of the adjacent fusing 10.

The auxiliary furnace is capable of being adjusted vertically, and the bushing 33 is one of any number of bushings having different thicknesses to fill in the space between the auxiliary furnace and the extension 6 depending upon the adjustment made of the position of the furnace 22. Beneath the furnace 22 is located any suitable type of cutting or severing means or sheared operating device 37, having shear blades 38 and 39 adapted to be periodically operated across the path of the outflow of the material from the lower flow hole to sever or cut off successive gobs or suspended charges or mold charges from the stream of material being delivered from the orifice 25.

For the purpose of adjusting the auxiliary furnace with respect to the forehearth, and also for adjusting the shear device relative to the outlet 30, the auxiliary furnace 22 is supported at both sides of the furnace upon suitable cage or frame members 40 and 41 which are connected by way of adjusting screws 42 and 43 leading to frame members 44 and 45 suitably connected to the extension or forehearth 6 of the melting tank or furnace. The adjusting screws have suitable nuts 45, 46, 47 and 48 which when operated upon the screw threaded parts of the screws, may be made to raise or lower the auxiliary furnace, and thus vary the position of the same with reference to the extension or forehearth 6. After the adjustment is made, a bushing or block 33 is then selected of such thickness as will fit in between the top of the auxiliary furnace and the bottom of the bushing 10 secured to the lower part of the extension 6, as clearly shown in Fig. 1 of the drawings.

Similarly, the shear device 37 may be supported upon a suitable frame member 49 connected by a threaded rod 50 to a frame member 51 secured in any suitable manner to the side of the auxiliary furnace 22. The rod 50 has adjusting nuts 52, 53, 54, and 55 by the operation of which the shear mechanism may be raised or lowered with reference to the opening 30 in the bushing 25 in the lower part of the auxiliary furnace 22.

For the purpose of supplying heat and maintaining the desired temperature in the chamber 23 of the auxiliary furnace, one or more openings 56 may be provided in the side of the furnace for the introduction of burning fuel or incandescent medium whereby the heat inside the furnace 22 may be such as to maintain the molten condition of the stream flowing from the upper to the lower flow holes 12 and 30 above described, suitable vents 60 being provided for the escape of the gases of combustion.

In the operation of the device, the molten material 2, which may be glass, flows from the main furnace chamber 4 into the channel 7, where the striating material may be added, and thence down into the throat or well 9 and out through the flow port 12. At the same time, supplemental or striating material which may be opal glass or other like and similar material, is periodically charged into the extension 6 at a point sufficiently remote from the well 9, whereby the striating material will float upon the surface of the molten mass in the channel 7 and form an elongated stream on or in the surface of such molten material moving towards and into the well 9. The stream of striating material will pass downwardly into the well and generally takes a position near or adjacent to the surface of the valve plunger or plug 15, so that the striating stream or component of the main stream will be more or less included in such main stream. The portions of this stream will become but slightly blended with each other in the time in which the material passes to and through the well 9. In this connection it is to be understood that the terms "blend" or "blended" as employed in the specification and claims are intended to mean an initial association of the striating material and the main mass of molten material, in such manner that they are slightly or partially commingled without substantial loss of their individual identities, and as distinguished from the idea of complete diffusion of one material throughout the other. In other words, the globules or particles of the added or striating ingredient will be but slightly scattered or disseminated in the body of the stream or molten mass, and will assume the form of a more or less irregular linear, ribbon-like disposition with respect to the main stream. As the stream moves downwardly and inwardly over the inclined surface 13 and to the delivery orifice 12, the linear, ribbon-like disposition is to some extent drawn out or elongated into ribbons or lines of interstriate material which becomes more and more attenuated and pronounced as the emergent stream increases in length and diminishes in cross section under the accelerating force of gravity. The stream will then pass through the flow port 12 and adhere to one side of the heated surface 35 of the bushing 33, as clearly shown in Fig. 1 of the drawings. The stream will then pass downwardly more or less vertically or in a columnar form, through the chamber 23 of the auxiliary furnace. By diverting the stream in this manner by causing the stream to adhere to the heated inclined surface 24, the stream will be caused to come in contact with the lower part of the auxiliary furnace rather than falling directly through the opening 30 in the lower bushing 25. The heat in the auxiliary chamber 23 is preferably so controlled and distributed, as to cause this downwardly flowing column of material to adhere to one side of the cone throat 34—35 of the block 33 as clearly shown in Fig. 1 of the drawings. This supplements the effect of the orifice surfaces 13—12, in drawing out the more or less irregular mass of the striating ingredient into the desired striae. The flowing body of the components, passes through the auxiliary furnace chamber 23 where it is allowed to be further elongated and produce a more finely striated stream of molten material. The resultant effect of this physical action may be varied by raising or lowering the auxiliary furnace 22, and the incidental altering of the thickness of the throat block 33 by inserting the block of required thickness in the space between the auxiliary furnace and the forehearth. The auxiliary furnace is adjusted in height to give this stream the desired length of flow or drop whereby a final distribution of the striae in the finished product can be effected. The action of the downwardly and outwardly inclined throat surface 35 serves to divert the stream flow to one side of the axial line of the spaced delivery orifices 12 and 30, and to direct the lower end of the attenuated stream of striated molten material against either the inclined upper surface 27 or against the inclined face 29 of the bushing 28. The distance of drop of the stream of hot viscous material, through the heated zone created by the auxiliary furnace is so controlled that as its thin or attenuated lower end approaches the inclined surface 27, the stream will wobble or waver or laterally vibrate or oscillate to form a succession of bends or doubled portions 57 whereby the stria carried in such stream will be given a more or less tortuous or folded or doubled form. The temperature in the auxiliary furnace is so regulated as to prevent formation of chilled cords or streaks in the stream during the downward flow thereof, and to insure sufficiently free flowing as to create the wobble or waver above referred to. The material will then pile up to form a molten pile 58 upon the lower part of the inclined surface 27 wherein the transparent or clear part of the mass will unite or join together into a single cohesive fused mass yet hold the folded or tortuous stria in the bent or tortuous form, and in overlapped and interlaced relation. The temperature in the auxiliary furnace chamber 23 is maintained at such a point that these overlapped and interlaced portions of the folded and doubled stream, are re-fused and welded into a cohesive and unitary mass of finely striated and attractively variegated material which will issue from the final delivery outlet 30. The piled material will then slowly flow towards and through the opening 30 of the lower bushing 28 and pass downwardly into an elongated form, as clearly shown in Figs. 1 and 6 of the drawings. The shear blades will then operate to cut off a portion of this outflowing stream, the timing of the shears being related with the timing of the flow of the material so as to gauge the size of the finished product desired. The stream flowing through the chamber 23 may be lengthened by either adjusting the position of the auxiliary furnace, or increasing the length of the inclined surfaces 35 of the bushing 33, and 27 of the lower wall of the furnace as well as the inclined surface 25 of the bushing 28. The bending or tortuous form of the stria in the finished product also may be thus varied. The size and weight of these severed gobs may be controlled and varied by either separately or concurrently altering the rate of flow of the material through the spaced orifices 12 and 30, relatively to the time intervals between successive severing operations. The shape and form of the delivered mold charges may also be regulated and altered, without changing the weight and size thereof by cooperatively adjusting the rate of discharge from the orifice 30 and the vertical position of the shear blades 38—39 with respect thereto, because each severing operation temporarily arrests the downward flow of the viscous material, and the interval of such arrest or pause, which is due in part to the support afforded by the momentarily closed shear blades and in part to the surface tension of viscosity of the freshly severed "stub" which remains suspended from the lower delivery orifice, will depend upon the length and diameter of the mass which is between the planes of the discharge outlet 30 and the shear cut.

Fig. 7 shows a marble produced by the present invention, which has a clear glass and transparent body part 59 of any desired color or even of clear glass, and in which is located, as in suspended form, the tortuous or folded form of the stria 60, which, from the figure, is shown as a distinct and clear line or streak thoroughly well distributed throughout the mass of the marble.

While I have herein described an illustrated embodiment of the invention and a method of carrying it out, and upon the drawings shown such embodiment, it is to be understood that the invention is not limited thereto, but may comprehend other constructions, arrangements of parts, details, features, and process steps without departing from the spirit thereof.

Having thus disclosed the invention, I claim:

1. The method of producing striated vitreous masses, comprising flowing a stream of partially blended molten materials, and causing said stream to become attenuated and to oscillate transversely of its line of flow while traveling through a closed heated space.

2. The method of producing striated mold charges, comprising flowing a stream of molten material blended with a striating component, laterally deflecting and partly arresting the stream by the impingement thereof on a heated support, resuming the flow of the stream after such arrest, and severing the final stream at intervals to form mold charges.

3. The method of producing striated vitreous objects, comprising flowing a stream of molten material with a striating component between spaced flow port devices, causing a wavering of the stream between said devices, and causing a piling of the wavered stream prior to passing through the second flow port device.

4. In a device for making vitreous objects, a feeder having guide members for directing the flow of a stream of molten vitreous material in a tortuous path, and means for varying the length of said stream.

5. In an apparatus for making vitreous objects, a feeder having upper and lower delivery outlets for the passage of a stream of molten vitreous material therebetween, and means interposed between said outlets for laterally deflecting the stream from a vertical path.

6. A device for making vitreous objects, comprising a feeder having upper and lower delivery outlets for the passage of a stream of molten vitreous material pendently therebetween, and an adjustable member positioned above said lower outlet for laterally deflecting the course of the said stream.

7. A device for making vitreous objects, comprising a feeder having upper and lower delivery outlets for controlling the flow of a stream of molten vitreous material therefrom, means associated with said feeder for varying the length of the flowing stream, and means intermediate the said outlets for laterally deflecting the line of flow therebetween.

8. In a device for making vitreous objects, a feeder having a plurality of outlet ports for controlling the passage of a stream of molten vitreous material therefrom, means associated with said feeder for varying the length of the said stream, means for producing transverse oscillations of the stream, and means for heating the material as it passes from one to the other of the said ports.

9. In a device for making vitreous objects, a feeder having a plurality of delivery devices for successively controlling the movement of a stream of molten vitreous material from the feeder, means for varying the distance between two of these successively acting delivery devices, means for heating said stream as it passes from one to another of the said devices, and means for producing a transverse folding and unconfined piling of the heated material at some intermediate point in its flow.

10. In a device for making vitreous objects, a feeder having upper and lower flow openings for the passage of a stream of molten vitreous material from said upper to said lower opening, means associated with said feeder for varying the length of said stream, and means for heating said stream as it passes from one to the other of said openings, said feeder having an inclined surface portion near said lower opening for causing the stream to take a tortuous form.

11. A device for making vitreous objects, comprising a melting tank for the production of a molten mass of heterogeneous vitreous components, a delivery outlet means therefor, means for controlling the flow of the molten material therefrom, an auxiliary furnace with a heated chamber embracing the said outlet and provided with another delivery outlet means, means for directing the flow of molten material in a tortuous path through the said heated chamber and for accumulating a molten mass of folded and transversely striated material in front of the lower delivery outlet means, and means for adjusting the length of the said stream flow to vary the tortuousness of the path of movement and the degree of striation in the said accumulated mass.

12. In a device for making vitreous objects, an auxiliary furnace having a chamber provided with upper and lower openings and intermediate inclined surfaces so constructed and arranged as to guide an attenuated stream of vitreous material in a tortuous path through the furnace.

13. In a device for making vitreous objects, a feeder having upper and lower flow openings for the passage of a stream of molten vitreous material from said upper to said lower opening, means for varying the distance between said openings, and means for heating said stream as it passes from one to the other of said openings, said feeder having an inclined surface portion near said lower opening for causing the stream to take a tortuous form.

14. An auxiliary furnace comprising a chamber having upper and lower inlet and outlet means, said means having inclined surfaces to which an attenuated stream of molten variegated vitreous material may adhere to cause the stream to take a tortuous path.

15. The method of producing a striated mass of vitreous material comprising effecting an initial blending of molten materials of different physical characteristics, discharging the blended materials in a free falling stream, and effecting a distribution of said materials through the stream by controlling the course and distance of flow of said stream through a closed heated space, and finally forming the striated mixture into gobs.

16. The method of producing a striated mass of vitreous material comprising effecting an initial blending of molten materials of different physical characteristics, and then effecting a more perfect lateral distribution of said materials with respect to each other by discharging the initially blended materials in a free falling stream, and causing said stream to become attenuated while passing through a closed heated space, and forming the mixture into gobs after it leaves said space.

17. The method of producing a striated mass of vitreous material comprising effecting an initial blending of materials of different physical characteristics, and effecting a more perfect lateral distribution of said blended materials by causing said stream to become attenuated and to oscillate while passing through a closed heated space.

18. The method of producing a striated mass of vitreous material comprising effecting an initial blending of molten materials of different physical characteristics, discharging a free falling stream of said blended materials into a heated space, arresting the flow of the stream at a position located a predetermined distance below its source and within said closed space so as to cause the material to form a pile and subsequently forming the material constituting said pile into gobs.

19. A method of producing a striated mass of vitreous material comprising effecting an initial blending of molten materials of different physical characteristics, discharging the blended materials in a free falling stream into a closed heated space, arresting the flow of said stream at a position located a predetermined distance from its source so as to cause the stream to oscillate before its flow is arrested, and effecting a complete homogenous distribution by collecting the material of said oscillating stream at said predetermined position, and then discharging said material.

20. The method of producing a striated mass of vitreous material comprising initially blending molten materials of different physical characteristics, discharging the blended materials in the form of a free falling attenuated stream within a closed heated space, causing the material within said space to accumulate in a molten pile, and continuously discharging material from said pile.

21. The method of producing a striated mass of vitreous material comprising initially blending molten materials of different physical characteristics and discharging the blended materials in a free falling stream within a heated space, arresting the flow of said stream at a predetermined position below its source so as to effect attenuation and oscillation of said stream in its travel to said predetermined position, and causing the material supplied by said stream to accumulate in a molten pile at said predetermined position, and continuously discharging from said pile.

22. The method of producing a striated vitreous material comprising forming an initial blending of molten materials of different physical characteristics and discharging the blended material in a free falling stream, causing the stream to move laterally and then downwardly with respect to said source within a heated space and controlling the distance of drop so as to effect attenuation and oscillation of said stream.

23. The method of producing striated vitreous material comprising effecting an initial blend of molten materials possessing different physical characteristics, discharging the initially blended materials in a free falling stream, causing said stream to move laterally and then downwardly with respect to its source within a heated space, controlling the distance of drop so that the stream will oscillate and become attenuated, and causing the material discharged in said stream to accumulate in a molten pile within said closed space, and continuously discharging from said pile.

24. The method of producing a striated vitreous material comprising maintaining a moving molten body of vitreous material, floating striating material thereon, initially blending said materials, discharging the blended materials in a free falling stream and controlling the course and distance of drop of said stream to effect oscillation and attenuation thereof.

25. The method of producing striated vitreous material comprising creating a downwardly flowing stream of molten constituents of different associated compositions and causing said stream to become attenuated and to oscillate laterally of its line of flow while travelling through a closed heated space, and controlling the extent of attenuation by arresting said stream within said heated space at a predetermined distance from its source.

26. The method of producing a striated mass of vitreous composition comprising creating a downwardly flowing stream of molten material containing an agglomeration of heterogeneous constituents, causing said stream to become attenuated and to oscillate during its flow and collecting the oscillating portion of the stream into successive folds in the form of a cohesive mass.

27. The method of producing a mass of striated vitreous composition comprising flowing a stream of blended molten materials of different physical characteristics and causing said stream to drop downwardly a sufficient distance to effect attenuation thereof, and causing the attenuated lower portion of said stream to impinge upon a heated support so that the impinging portions are folded and doubled on each other while sustained by said support and thereby produce a tortuous distribution of the interstriated constituent of the supported mass.

28. The method of producing striated vitreous objects comprising creating a flowing stream of molten material including a striating component, discharging said stream downwardly toward a piling surface and regulating the distance of drop of said stream so as to cause the same to become attenuated before it reaches said piling surface, and causing the attenuated portion of the stream to accumulate in a pile with the impinging portions folded and doubled on each other.

29. The method of producing striated vitreous objects comprising creating a flowing stream of molten material including a striating component, discharging said stream downwardly toward a piling surface and regulating the distance of drop of said stream so as to cause the same to become attenuated and to oscillate before it reaches said surface, and piling the attenuated oscillating portions of the stream on said surface so that the impinging portions will be folded and doubled on each other while sustained by said surface.

30. The method of producing striated vitreous objects comprising flowing a stream of molten material including a striating component from a flow opening and downwardly into a columnar form, interrupting the drop of the stream at such a position as will cause attenuation of the stream during its downward travel, causing the attenuated stream to form a pile at the position of said interruption and continuously discharging material from the pile stream through a second flow opening to provide suspended charges.

31. The method of producing striated vitreous objects comprising flowing a stream of molten material blended with a striated component pendently between vertically spaced flow port devices, and causing a deflection of the stream of blended material in the space between said flow port devices.

SELLERS H. PELTIER.